Sept. 23, 1924.

J. RASMUSSEN

CYCLE FRAME OF STEEL BARS

Filed April 9, 1923

1,509,177

Inventor
J. Rasmussen

Patented Sept. 23, 1924.

1,509,177

UNITED STATES PATENT OFFICE.

JOHANNES RASMUSSEN, OF COPENHAGEN, DENMARK.

CYCLE FRAME OF STEEL BARS.

Application filed April 9, 1923. Serial No. 630,920.

*To all whom it may concern:*

Be it known that I, JOHANNES RASMUSSEN, a subject of the King of Denmark, residing at Copenhagen, K, No. 13 Peder Skramsgade, Denmark, have invented certain new and useful Improvements in Cycles Frames of Steel Bars, of which the following is a specification.

This invention relates to improvements in bicycles and more specifically to a bicycle frame having steel bars instead of tubes. A hitherto unknown elasticity is attained by the present invention, as the steel bars impart a conspicuous elastic capacity to the frame, so that the shocks from the road are prevented from being transmitted beyond the frame. It has proved to be difficult, to assemble the parts of a cycle frame of this character by soldering or welding, and the present invention, consequently, relates to a special method of assembling, by which the bars of the frame and the brackets are joined by threads, which should only extend in one direction, in order to prevent the bars from accidentally unscrewing.

The method will be hereinafter described in connection with the accompanying drawings, which illustrate parts of a bicycle frame constructed in accordance with the method. In these drawings.

Figure 1:
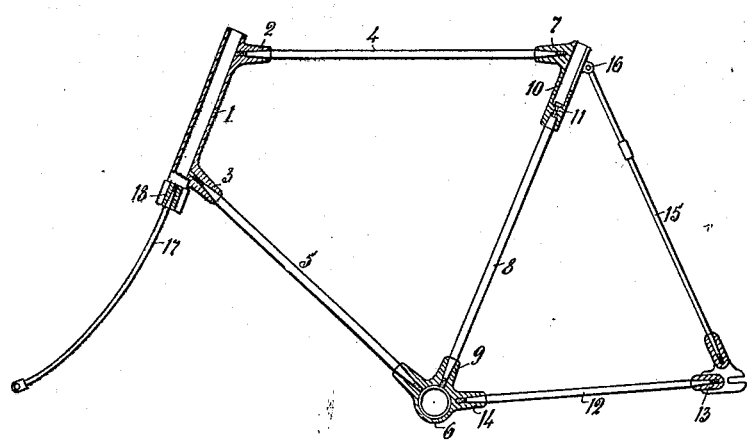
Fig. 1 is a side view partly in section of the improved cycle frame.
Figure 2:
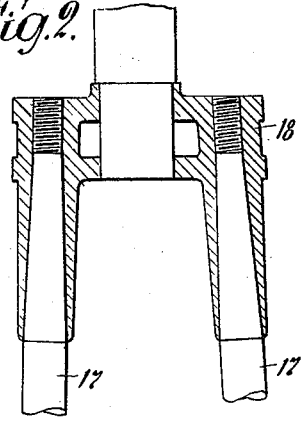
Fig. 2 is a transverse vertical sectional view of the front fork of the same.

Into the upper and lower sockets 2 and 3 of the front tube or bracket 1, the bars or rods 4 and 5 are screwed. These bars have conical front end portions which merge into threaded extremities, and these extremities and the conical portions are located entirely within the sockets 2 and 3. A crank bearing 6 has a socket which is now screwed on to the lower end of the bar 5 and the lower end of this bar is formed in the same manner as its upper end, that is, it has a conical lower end portion merging into a threaded extremity which engage complementary surfaces in the socket of the bearing 6. It is pointed out at this time that all of the threaded portions on each of the bars hereinbefore and hereinafter referred to, extend in the same direction, that is, they are all either right hand or left hand threads. After the parts 1, 2, 3, 4, 5 and 6 have been assembled, an intermediate bar 8 having a conical lower end terminating in a threaded extremity, is screwed into the socket 9 of the crank bearing 6. The upper end of this bar 8 does not have a threaded extremity, but instead it is provided with a screw threaded aperture, for a purpose hereinafter described. Before or after the bar 8 is placed in position, the saddle bracket 10 is screwed on the rear end of the bar 4 and for this purpose the bar 4 has a conical rear end portion terminating in a threaded extremity, which fits into the complementary socket 7. After the bracket 10 has been applied to the bar 4, the latter is bent upwardly at its rear end, so that the upper end of the bar 8 may enter the socket in the lower end of the bracket 10. Then a screw 11 is placed in the bracket 10 and screwed into the before mentioned threaded aperture in the upper end of the bar 8.

The horizontal rear frame bars 12 also have conical end portions terminating in threaded extremities and the front ends of these bars screw into sockets 14 on the crank bearing 6, after which the rear fork brackets 13 are screwed onto the rear ends of the bars 12. The oblique rear bars 15 have conical lower end portions and threaded extremities which screw into the brackets 13 and the upper ends of the bars 15 are bolted at 16 to a tongue on the saddle bracket 10. As the rear fork parts 13 will be secured to the rear axle, it is obvious that the bars 12 cannot work themselves loose.

The shanks 17 of the front fork are in the same manner screwed into the heads 18 of the front fork, and these bars cannot unscrew as they are prevented from doing so by the front axle.

From the foregoing, it is believed that the method of assembling and the construction of the frame may be readily understood and it is apparent that changes in the details may be made without departing from the spirit of the invention as expressed in the claim.

What I claim and desire to secure by Letters-Patent is:

A bicycle frame including a front bracket having rearwardly extending threaded sockets, upper and lower bars having their front ends in threaded engagement with said sockets, a crank bearing having a socket in threaded engagement with the lower bar, an intermediate bar having its lower end screwed into the crank bearing, a saddle bracket connected to the upper end of the intermediate bar and the rear end of the upper bar, said bracket having a threaded socket engaging one of the last mentioned bars and a screw for connecting the saddle bracket with the other one of the last mentioned bars, rear bars in threaded connection with said crank bearing, rear fork brackets in threaded engagement with the rear ends of the rear bars and oblique bars connecting said rear brackets to the saddle bracket, all of the threaded connections having their threads extending in the same direction in order to prevent the bars from accidentally unscrewing, and each of the upper, lower, intermediate and rear bars having frustro-conical end portions.

In testimony whereof I affix my signature in presence of two witnesses.

JOHANNES RASMUSSEN.

Witnesses:
GILBERT ASK,
CHAS. HUDE.